United States Patent
Sakayori

(10) Patent No.: US 8,948,798 B2
(45) Date of Patent: Feb. 3, 2015

(54) TRANSMISSION CONTROL DEVICE, RECEPTION CONTROL DEVICE, AND CONTENT TRANSCEIVING SYSTEM

(75) Inventor: Takahiro Sakayori, Tokyo (JP)

(73) Assignee: Sony Corporation (JP)

( * ) Notice: Subject to any disclaimer, the term of this patent is extended or adjusted under 35 U.S.C. 154(b) by 374 days.

(21) Appl. No.: 13/292,458

(22) Filed: Nov. 9, 2011

(65) Prior Publication Data
US 2012/0127197 A1 May 24, 2012

(30) Foreign Application Priority Data
Nov. 22, 2010 (JP) ................. P2010-260000

(51) Int. Cl.
| H04B 7/00 | (2006.01) |
| H04M 3/00 | (2006.01) |
| H04B 7/24 | (2006.01) |
| G09G 5/00 | (2006.01) |
| G06F 3/01 | (2006.01) |
| G06F 3/0346 | (2013.01) |

(52) U.S. Cl.
CPC .............. G06F 3/017 (2013.01); G06F 3/0346 (2013.01)
USPC .............. 455/500; 455/39; 455/420; 345/619

(58) Field of Classification Search
USPC .............................. 455/39, 420, 500; 345/619
See application file for complete search history.

(56) References Cited

U.S. PATENT DOCUMENTS

| 2002/0140745 A1* | 10/2002 | Ellenby et al. ................. 345/848 |
| 2005/0053017 A1* | 3/2005 | Komiya et al. ................. 370/255 |
| 2005/0090288 A1* | 4/2005 | Stohr et al. .................... 455/566 |
| 2005/0212749 A1* | 9/2005 | Marvit et al. .................. 345/156 |
| 2007/0004451 A1* | 1/2007 | Anderson ................... 455/556.1 |
| 2009/0088204 A1* | 4/2009 | Culbert et al. ............. 455/556.1 |
| 2010/0160004 A1* | 6/2010 | Alameh et al. ............. 455/575.1 |
| 2010/0225470 A1* | 9/2010 | Marwah et al. .......... 340/539.13 |
| 2011/0109751 A1* | 5/2011 | Chang et al. ................ 348/207.1 |
| 2012/0054620 A1* | 3/2012 | Tilley et al. ................... 715/727 |
| 2013/0171980 A1* | 7/2013 | Park .............................. 455/420 |

FOREIGN PATENT DOCUMENTS

JP     2010-140391 A    6/2010

* cited by examiner

*Primary Examiner* — Temesgh Ghebretinsae
*Assistant Examiner* — Devan Sandiford
(74) *Attorney, Agent, or Firm* — Lerner, David, Littenberg, Krumholz & Mentlik, LLP

(57) ABSTRACT

A transmission control device may include an acquiring unit to acquire information indicating an orientation of a transmission apparatus. In addition, the device may include a control unit to control the transmission apparatus to transmit to a reception apparatus content of the transmission apparatus when an operation is performed to the transmission apparatus after the information indicating the orientation is acquired, the operation corresponding to the orientation.

23 Claims, 14 Drawing Sheets

TRANSMISSION CONTROL DEVICE, RECEPTION CONTROL DEVICE, AND CONTENT TRANSCEIVING SYSTEM

CROSS REFERENCE TO RELATED APPLICATIONS

This application claims priority from Japanese Patent Application No. 2010-260000 filed in the Japan Patent Office on Nov. 22, 2010, the entire content of which is hereby incorporated by reference.

BACKGROUND

The present disclosure relates to a transmission control device, a reception control device, and a content transceiving system that are preferably used when transmitting and receiving content including, for example, images, music, or the like.

In the related art, in an electronic apparatus for processing image data, such as a digital still camera or a digital video camera, an operability of a user has been improved using various GUIs (Graphical User Interface). In the electronic apparatus where the GUI is adopted, the user can perform operations using a graphical element such as an icon or a window that is displayed on a screen. Accordingly, by using a GUI, a user who is not familiar with the electronic apparatus can appropriately perform a desired operation. In addition, there is a content transceiving system which transmits and receives content between a plurality of electronic apparatuses.

A technology of improving a usability of the electronic apparatus is disclosed in Japanese Unexamined Patent Application Publication No. 2010-140391. In the technology, it is possible to detect that a specific operation, such as laying down, tilting, moving, or hitting the device itself, has been made, through a motion sensor. In addition, a process is performed, in which one or more items of image data that are specified in advance, are stored in a folder, reproduced, and transmitted to another apparatus.

SUMMARY

Meanwhile, in recent years, a technology in which an electronic apparatus obtains position information of the device itself from a GPS (Global Positioning System) system, and embeds the position information in the content along with a date of photography, has been proposed. However, in the past, even if the electronic apparatus obtains the position information of the device itself, there was no method of effectively using the position information, in order to share the content among a plurality of electronic apparatuses. In addition, further improvement of the usability has been desired in order for the user to share the content intuitively among the adjacent electronic apparatuses.

It is desirable to easily share content among a plurality of apparatuses.

In accordance with one embodiment, a transmission control device may include an acquiring unit to acquire information indicating an orientation of a transmission apparatus. In addition, the transmission control device may include a control unit to control the transmission apparatus to transmit to a reception apparatus content of the transmission apparatus when an operation is performed to the transmission apparatus after the information indicating the orientation is acquired, the operation corresponding to the orientation.

In accordance with another embodiment, a reception control device may include an operation detection unit to detect an operation performed to a reception apparatus after information indicating an orientation of the reception apparatus is acquired. In addition, the reception control device may include a control unit to control reception of content from a transmission apparatus at the reception apparatus when the operation performed to the reception apparatus corresponds to a predetermined orientation.

In accordance with another embodiment, a method of transmission control may include acquiring information indicating an orientation of a transmission apparatus; and controlling, by a processor, the transmission apparatus to transmit to a reception apparatus content of the transmission apparatus when an operation is performed to the transmission apparatus after the information indicating the orientation is acquired, the operation corresponding to the orientation.

In accordance with another embodiment, a method of reception control may include detecting an operation performed to a reception apparatus after information indicating an orientation of the reception apparatus is acquired; and controlling, by a processor, reception of content from a transmission apparatus at the reception apparatus when the operation performed to the reception apparatus corresponds to a predetermined orientation.

In accordance with another embodiment, a transceiver apparatus may include an acquiring unit to acquire information indicating an orientation of the apparatus. In addition, the apparatus may include an operation detection unit to detect an operation performed to the apparatus. Further, the apparatus may include a control unit to control the apparatus to transmit to a reception device content of the apparatus when an operation is performed to the apparatus after the information indicating the orientation is acquired, the operation corresponding to the orientation, where the control unit controls reception of content from a transmission device at the apparatus when the operation performed to the apparatus after the information indicating the orientation is acquired corresponds to a predetermined orientation.

In this manner, it is possible to transmit content to the reception control device by a user who is performing a predetermined operation using the transmission control device.

According to the embodiment of the disclosure, the transmission control device recognizes a position of the reception control device, and the user performs a predetermined operation to the position, thereby it is possible to transmit content from the transmission control device to the reception control device and receive at the reception control device the content transmitted from the transmission control device. For this reason, it is possible for the user to transmit and receive the content by an intuitive operation.

DETAILED DESCRIPTION OF EMBODIMENTS

Hereinafter embodiments for embodying the disclosure will be described.

Here, the description will be given in the following order.

1-1. a first embodiment (an example of content transceiving control between cameras)

1-2. a modified example of the first embodiment (a modified example of a user interface)

2-1. a second embodiment (an example of content transceiving control between a camera and a server)

2-2. a modified example of the second embodiment (a modified example of a user interface)

3. Modified Examples

<1-1. A First Embodiment>

[An Example of Content Transceiving Control Between Cameras]

Hereinafter, a first embodiment of the disclosure will be described with reference to FIGS. 1 to 10. In the embodiment, an example (hereinafter, referred to as "the embodiment"), where a content is applied to a content transceiving system 3 which transmits and receives content between devices through intuitive operation by a user, will be described. In addition, the content includes a text, music, still images, moving images, files and folders including a combination thereof.

Figure 1:
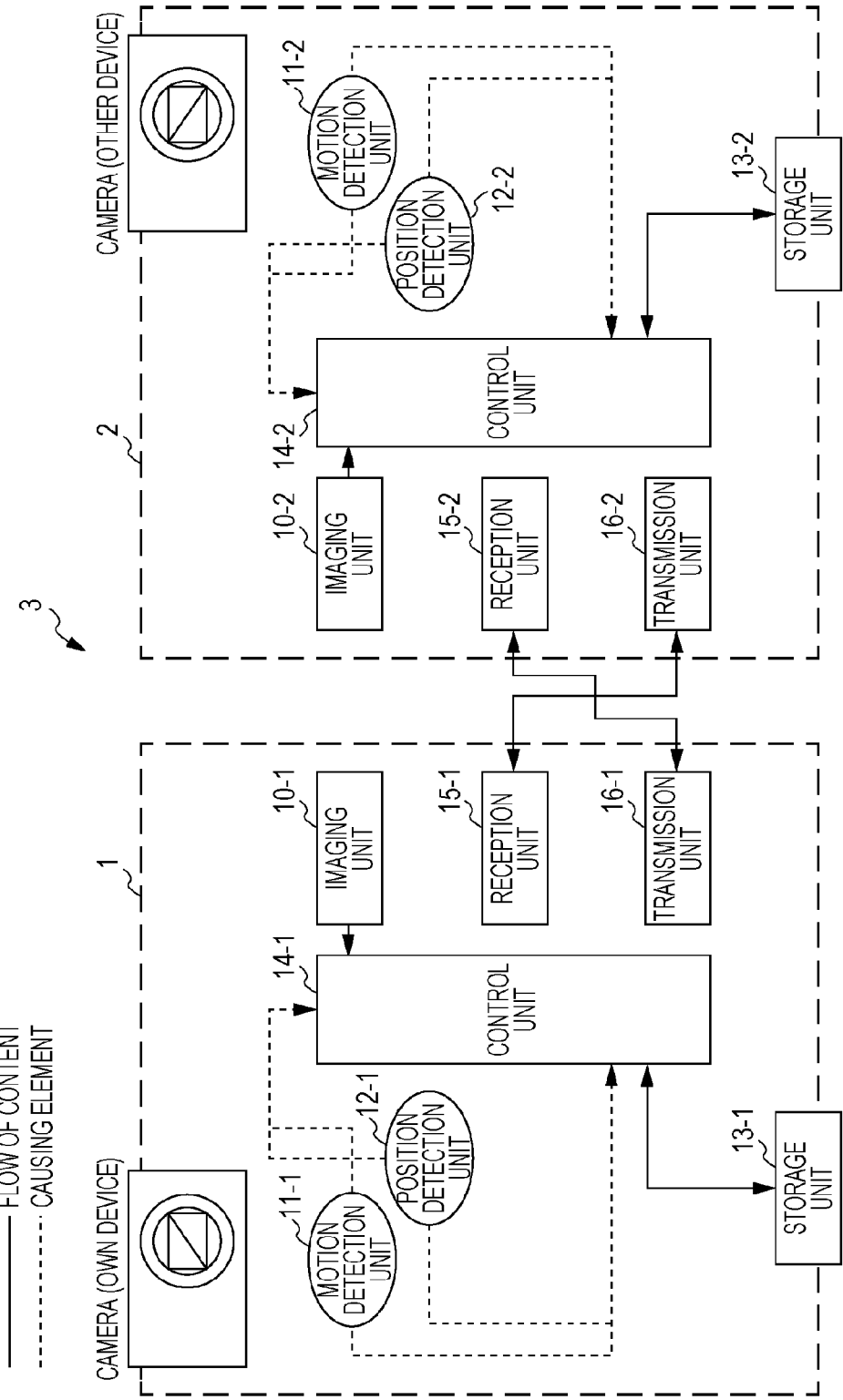
FIG. 1 is a block diagram of internal configuration of a content sharing system in a first embodiment of the disclosure.

FIG. 1 shows an example of an internal configuration of a content transceiving system 3 in the embodiment.

The content transceiving system 3 includes cameras 1 and 2 which have communications function. The camera 1 and camera 2 can transmit data to each other through a short and medium distance wireless communication (for example, Bluetooth (registered trademark), Eye Fi (registered trademark)). Hereinafter, a case where the camera 1 is used as a transmission control device for transmitting content and the camera 2 is used as a reception control device for receiving content will be described.

The cameras 1 and 2 respectively include imaging units 10-1 and 10-2 that are constituted by an imaging element, an optical lens, or the like. The camera 1 which transmits content includes a motion detecting unit 11-1 for detecting the fact that a predetermined motion is performed with respect to a position where the camera 2 is present. In addition, the motion detection unit 11-1 and a motion detection unit 11-2 included in the camera 2 detect an angle which the users move their arm and a speed of moving the arm, according to a change in acceleration to obtain a predetermined motion. Further, the motion detection unit 11-2 has a function of detecting the fact that a predetermined motion is performed with respect to a position where the camera 1 is present.

In addition, the cameras 1 and 2 obtain position information from a satellite positioning system (for example, a GPS system), and include position detection units 12-1 and 12-2, and recording units 13-1 and 13-2 that are attachably and detachably mounted. The recording units 13-1 and 13-2 include an ID (identifier) for uniquely identifying the own device and ID registration units 13a-1 and 13a-2 which register an ID for uniquely identifying other devices that are communication partners.

The control unit 14-1 provided in the camera 1 selects content to be transmitted to the camera 2 from the recording unit, when detecting the fact that a predetermined motion is performed toward a position where the camera 2 is present. Further, the control unit performs a control for transmitting the selected content to the camera 2 from a transmitting unit 16-1. In addition, when the content is moving images, streaming transmission may be performed.

The control unit 14-2 provided in the camera 2 transmits its current position information to the camera 1 from the transmission unit 16-2. Further, the control unit performs a control of receiving content from the camera 1 through a reception unit 15-2 for receiving content, when it is possible to receive content from the camera 1 and a predetermined motion is performed to the camera 1. In addition, the control unit 14-2 receives an ID which can identify a plurality of cameras 1 from a plurality of cameras 1, and notifies of a rejection of reception to a camera 1, which is not permitted to transmit content, when there is a plurality of cameras 1.

Further, the cameras 1 and 2 include transmission units 16-1 and 16-2 for transmitting content from the device itself to other devices, and reception units 15-1 and 15-2 for receiving content from other devices to the device itself. The reception unit 15-1 provided in the camera 1 has a function of receiving information, regarding whether or not the camera 2 is able to receive content, from the camera 2. In addition, when the camera 2 is not able to receive content, the control unit 14-1 provided in the camera 1 performs a control of not transmitting content, even though the camera 2 is present at an orientation to which a predetermined motion of the camera 1 is performed.

Figure 2:
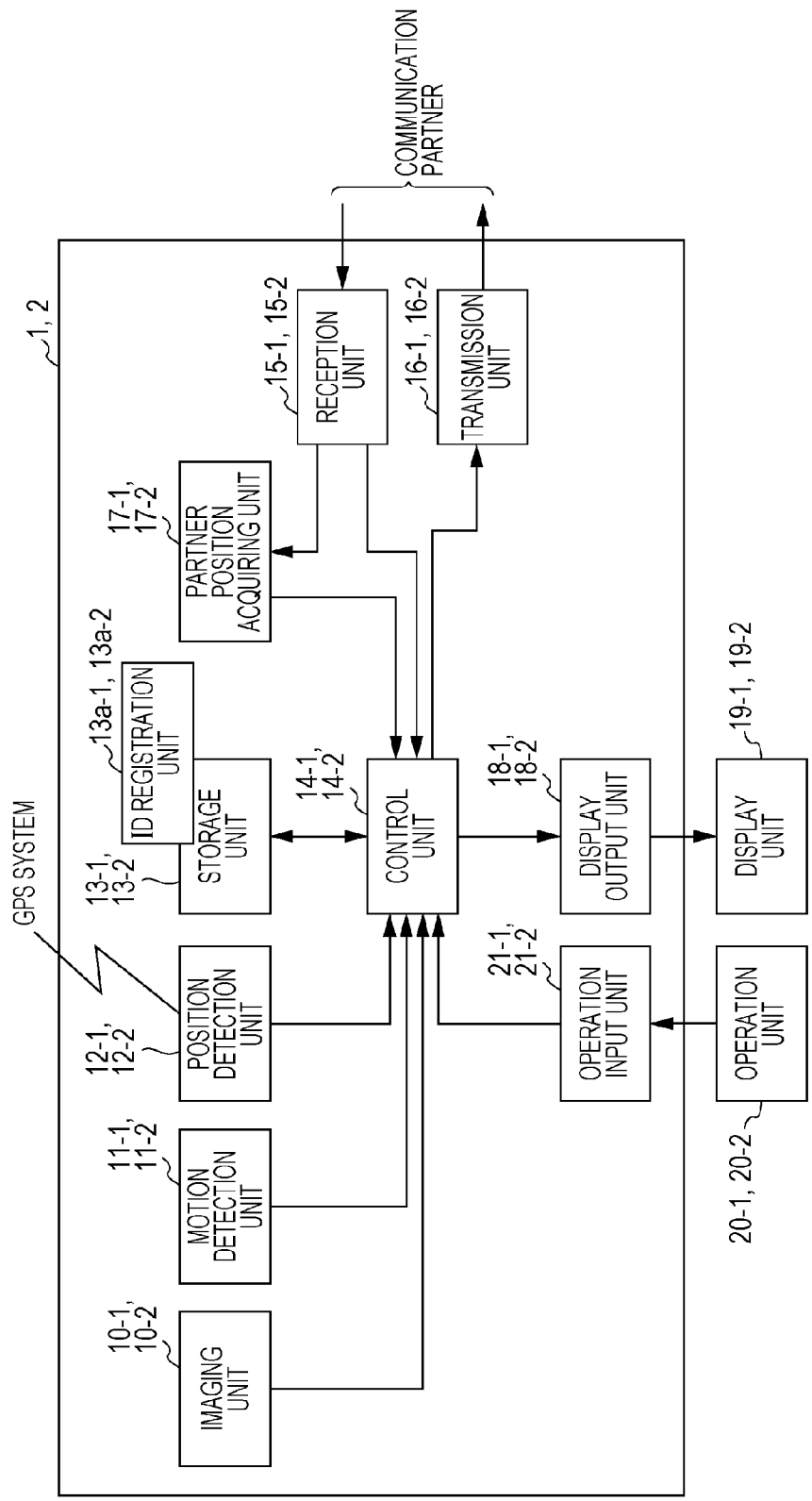
FIG. 2 is a block diagram of internal configuration of a camera in the first embodiment of the disclosure.

FIG. 2 shows an example of the internal configuration of the cameras 1 and 2.

The control units 14-1 and 14-2 control operations in each unit in the cameras 1 and 2.

The camera 1 includes a partner position acquiring unit 17-1 for acquiring a position where the camera 2 is present, and at which the camera 2 receives content in a wireless manner. On the other hand, the camera 2 includes a partner position acquiring unit 17-2 for acquiring a position where the camera 1 is present, where the position is acquired from a transmission control device (camera 1) which transmits content in a wireless manner.

In addition, the cameras 1 and 2 include display output units 18-1 and 18-2 for outputting a user interface which is constituted by image information, such as an icon, to display units 19-1 and 19-2. The display output unit 18-1 provided in the camera 1 outputs an icon, which is generated on the basis of an identification code which uniquely identifies the camera 2, to the display unit 19-1 as information which shows a positional relationship of the current position of the camera 2 with respect to the current position of the camera 1. Further, the control unit 14-1 provided in the camera 1 performs a control of transmitting content to the camera 2 to be present in the orientation where a predetermined motion is made when the predetermined motion is performed toward the current position of the camera 2.

On the other hand, the display output unit 18-2, which is provided in the camera 2, outputs information showing a positional relationship of the current position of the camera 1 to the display unit 19-2 with respect to the current position of the camera 2. Then, the control unit 14-2, which is provided in camera 2, performs a control of receiving content displayed on the display unit 19-2 from the camera 1, when the predetermined motion is performed.

In addition, the cameras 1 and 2 include operation input units 21-1 and 21-2 for transmitting an operational signal to be transmitted to the control units 14-1 and 14-2 using operation units 20-1 and 20-2, respectively by the user. The display unit 19-1, the operation unit 20-1, and the display unit 19-2 and the operation unit 20-2 constitute a touch panel display by overlapping with each other, and are attached to the cameras 1 and 2. However, the display units 19-1 and 19-2 may be an external display monitor, the operation units 20-1 and 20-2 may be an input device such as a mouse, a key board, a stylus pen, or the like.

Figure 3A:
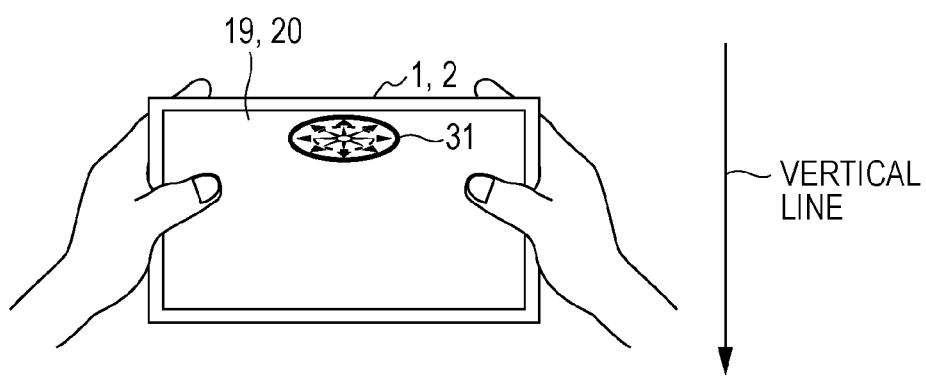
FIGS. 3A and 3B are explanatory diagrams for showing an example of holding the camera in the first embodiment of the disclosure.
Figure 3B:
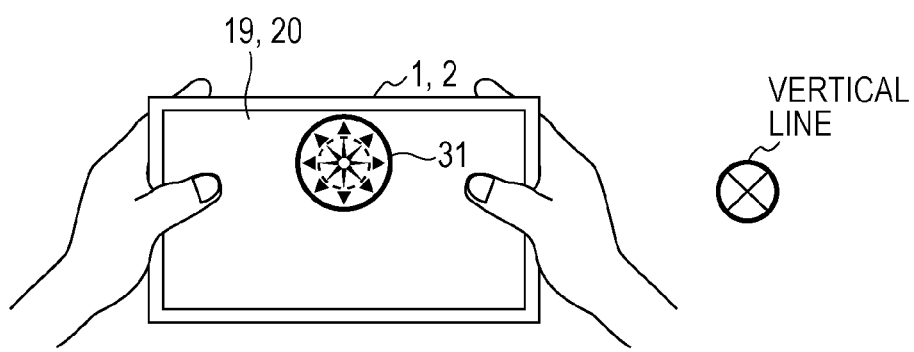

FIGS. 3A and 3B are examples showing how to hold the camera 1.

FIG. 3A is an example when the camera 1 is in an upright state.

FIG. 3B is an example when the camera 1 is laid down.

Hereinafter, the camera 1 will be described, however, the user interface of the camera 2 changes similarly to the camera 1.

The user holds the camera 1 with both hands and makes gestures while watching information displayed on the display unit 19-1. The reason for holding the camera with both hands is that, a gyro sensor is made to fix an acceleration of one of three axes to be detected by the gyro sensor as a trigger. In the following descriptions, the user holds the camera 1 as shown in FIG. 3B.

In addition, a compass icon 31 showing the orientation of the camera 1 changes its display according to the state of the camera 1. For example, a state shown in FIG. 3A is a display where the user recognizes the compass from a tilted orientation. In a state shown in FIG. 3B, the display changes to a display where the user recognizes the compass from right above.

Further, the control unit 14-1 can distinguish whether it is a transmission or reception of the content when the user makes following gestures.

1. The users turn their wrist from the front to the rear.
This means a transmission of content.
2. The users turn their wrist from the rear to the front.
In this case, this means a reception of content.

Hereinafter, an example where an icon is displayed on the display unit 19-1 in a state of laying down the camera 1 (refer to FIG. 3B), will be described.

Figure 4:
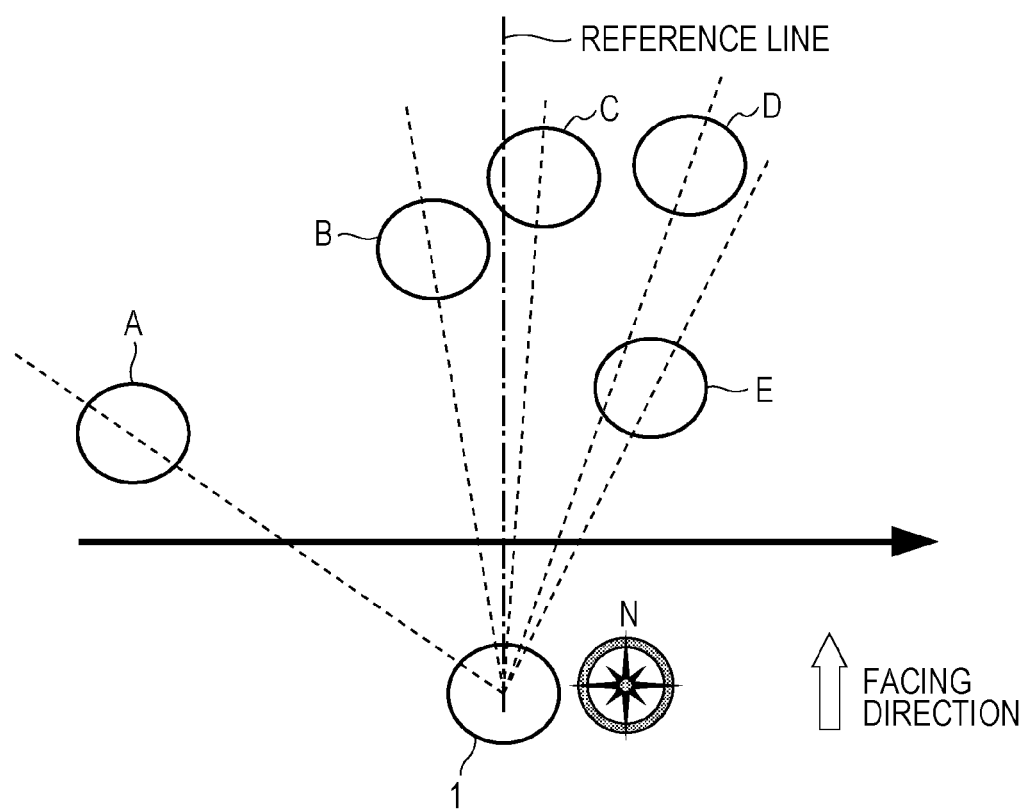
FIG. 4 is an explanatory diagram for showing an arrangement example of a camera for transmitting content and a plurality of cameras for receiving content, in the first embodiment of the disclosure.

FIG. 4 shows a camera 1 which transmits content, and an arrangement example of a plurality of cameras 2 which receive content.

When the user orients the camera 1 to north, which is shown in compass, the orientation where the camera 1 is facing is set to a reference line, and "A" to "E", denoting IDs which are scanned from the left (West) and are attached to the camera 2, are registered in an ID registration unit 13$a$-1 of the camera 1. In addition, the ID may be attached to the content itself which is to be transmitted or received.

Figure 5:
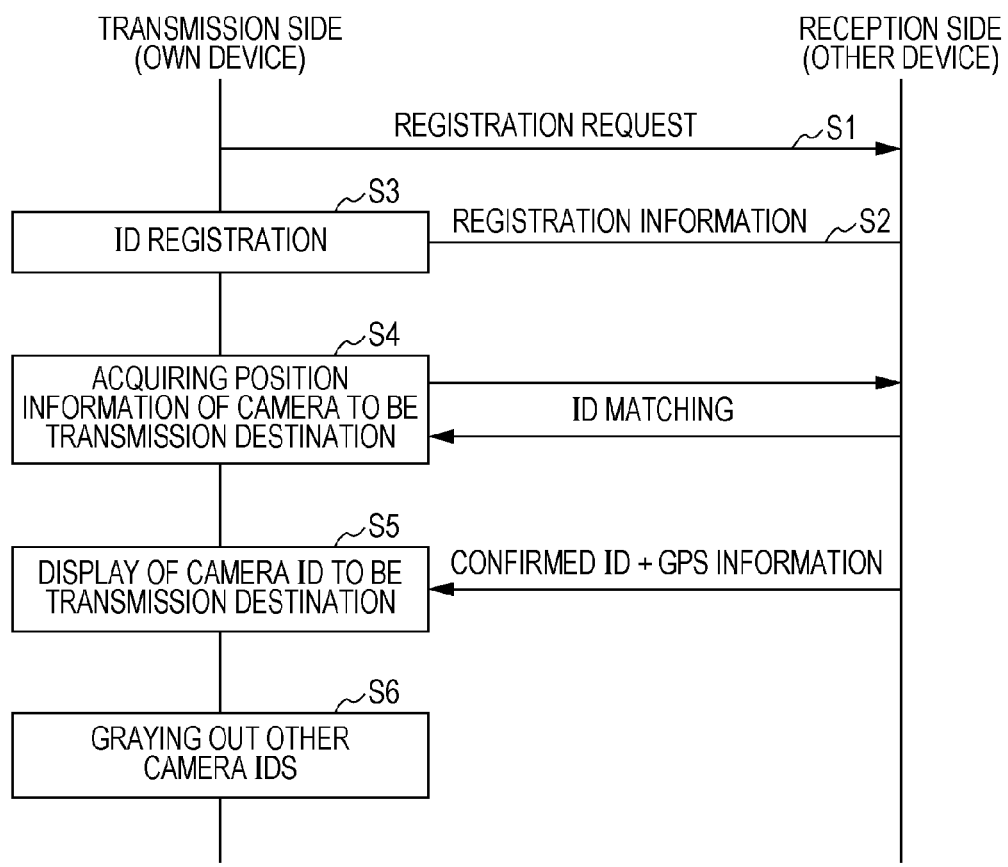
FIG. 5 is an explanatory diagram for showing an example of processing, where a camera on the transmission side registers an ID of a camera on the reception side to an ID registration unit, in the first embodiment of the disclosure.

FIG. 5 shows a processing example in which the camera 1 on the transmission side registers an ID, which is attached to the camera 2 on the reception side, in the ID registration unit 13$a$-1.

First, the camera 1 makes a request for registering an ID with respect to the camera 2 (Step S1). The camera 2 receives the request and transmits the ID attached to the camera 2 to the camera 1 (Step S2). Further the camera 1 registers the ID of the camera 2 in the ID registration unit 13$a$-1 (Step S3).

Subsequently, when the camera 1 transmits content to the camera 2, the camera 1 confirms whether or not the ID registered in the ID registration unit 13$a$-1 matches the ID received from the camera 2 (Step S4). Next, the camera 1 receives the confirmed ID and GPS information from the camera 2, registers the ID and the GPS information to the ID registration unit 13$a$-1 as the ID of the transmission destination (Step S5), and highlights an icon of the camera 2 on the display unit 19-1. Meanwhile, regarding the other camera 2, an icon denoting the other camera 2 is grayed out on the display unit 19-1, so that it is displayed not to be selected (Step S6).

Figure 6:
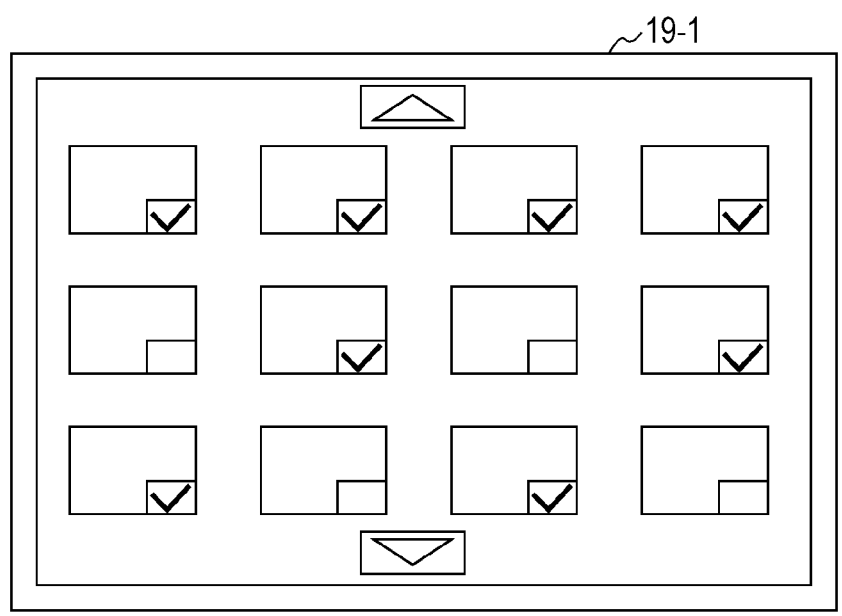
FIG. 6 is an explanatory diagram for showing an example of displaying an index screen for selecting an image as content, which is transmitted by the camera on the transmission side, in the first embodiment of the disclosure.

FIG. 6 is a display example of an index screen for selecting an image as content to be transmitted.

The camera 1 as the transmission source displays the index screen, in which thumbnail images are arranged in line, on the display unit 19-1. The transmitted content can be distinguished from other contents by filling in a check mark.

Figure 7:
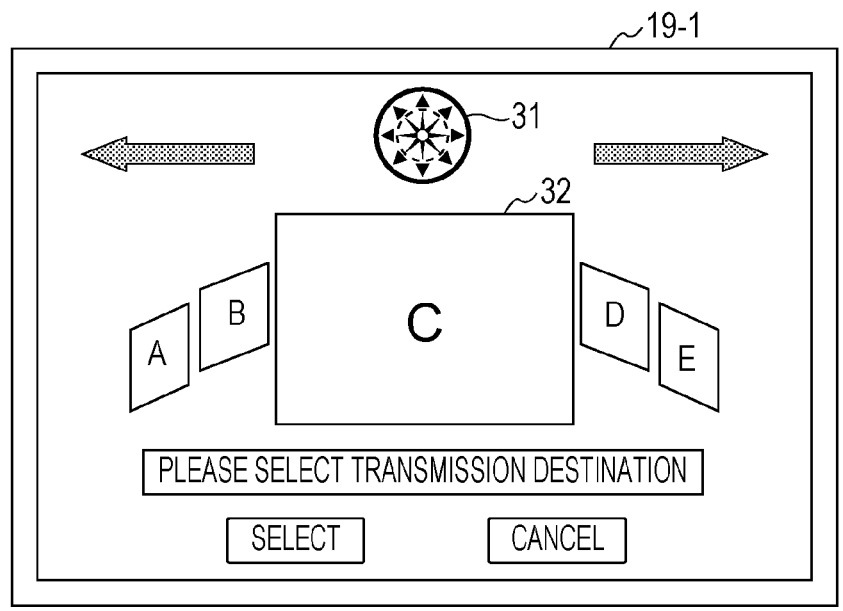
FIG. 7 is an explanatory diagram for showing an example of displaying a screen for selecting a camera, which is a transmission destination of the content, in the first embodiment of the disclosure.

FIG. 7 is a display example of a screen in which the camera 2 is selected, as a transmission destination of the content.

A display output unit 18-1, which is included in the camera 1, outputs information to the display unit 19-1, which shows a positional relationship of current position of the camera 2 according to an angle of a position where a plurality of cameras 2 exist, by setting its own current position as a center. A compass icon 31 is displayed on the upper side of the display unit 19-1 and "A" to "E" which show IDs attached to the camera 2 is displayed to be scrolled vertically near the center of the display unit 19-1. In the embodiment, in order to highlight the ID indicating camera 2, a virtual folder 32 is displayed larger than the folder which includes the other ID. The name of folder included in the camera 2 on the transmission side may be attached to the virtual folder 32. The icon of ID "C" displayed on the virtual folder 32 is sequentially exchanged according to the movement of icons of other IDs.

In detail, an ID of a camera 2 located nearest to the reference line with respect to the orientation the user is facing is displayed on the virtual folder 32. Further, a folder including an ID is displayed on the left and right of the virtual folder 32 in the order of a candidate of the transmission destination which is close to the reference line. If it is measured by distance, a camera 2 with an ID "E" is closer than the camera 2 with an ID "D", however, since the angle determined by the user (as a center) is only the necessary information, the camera 2 with an ID "E" comes to the rightmost end. For example, when the user designates the right arrow, an icon which denotes a camera 2 with an ID "D" located at a position on the right side of the camera 2 with an ID "C", moves to the virtual folder 32, and the icon denoting the camera 2 with an ID "C" moves to the left.

Figure 8:
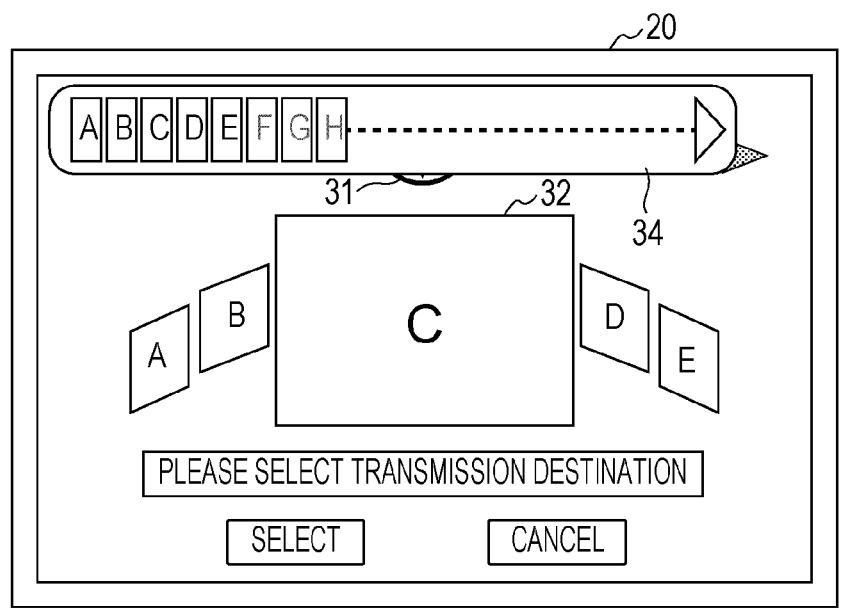
FIG. 8 is an explanatory diagram for showing an example of displaying a screen for selecting a plurality of transmission destinations of the content, in the first embodiment of the disclosure.

FIG. 8 shows a display example of a screen for selecting a plurality of transmission destinations of the content.

In the example, a vertical scroll bar 34 is displayed overlapping with the compass icon 31. IDs "A" to "E" of the cameras 2 are displayed on the vertical scroll bar 34 as the registered IDs, like a pop-up menu. At this time, the user may arbitrarily select a camera 2 to be the transmission destination and transmit the content.

Figure 9:
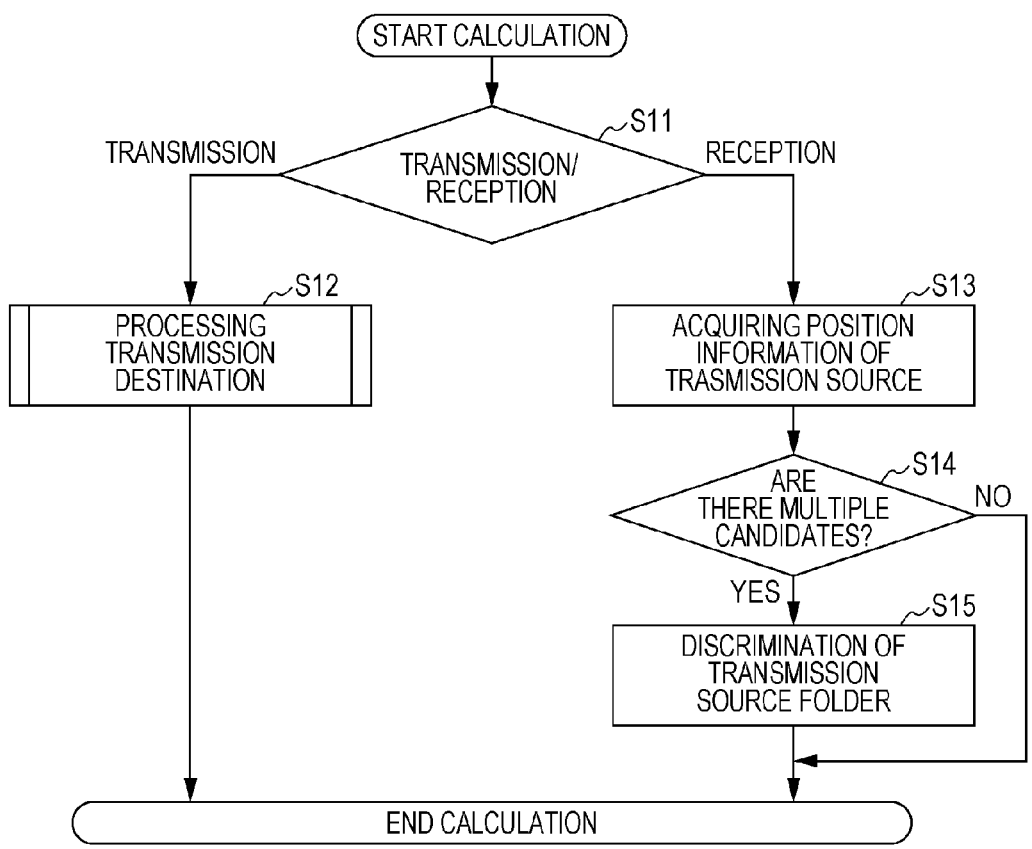
FIG. 9 is an explanatory diagram for showing an example of a folder dividing process performed by a control unit, in the first embodiment of the disclosure.

FIG. 9 shows a processing example in which the control unit 14-1 divides folders.

First, the control unit 14-1 determines whether the camera 1 is a transmission side or a reception side (Step S11). When the camera 1 is the transmission side, a process for a transmission destination is performed (Step S12), and the process ends. The process for the transmission destination will be described in detail later (refer to FIG. 10).

In the determination process in Step S11, when the camera 1 is determined to be the reception side, the control unit 14-1 obtains position information of a camera which is a transmission source of the content (Step S13). Subsequently, the control unit determines whether or not there are plural candidates to be the transmission source (Step S14). When there is a single candidate, the process ends. On the other hand, when there is a plurality of candidates, the control unit discriminates folders of the transmission source included in the camera of the transmission source, which is the candidate (Step S15), and then ends the process.

Figure 10:
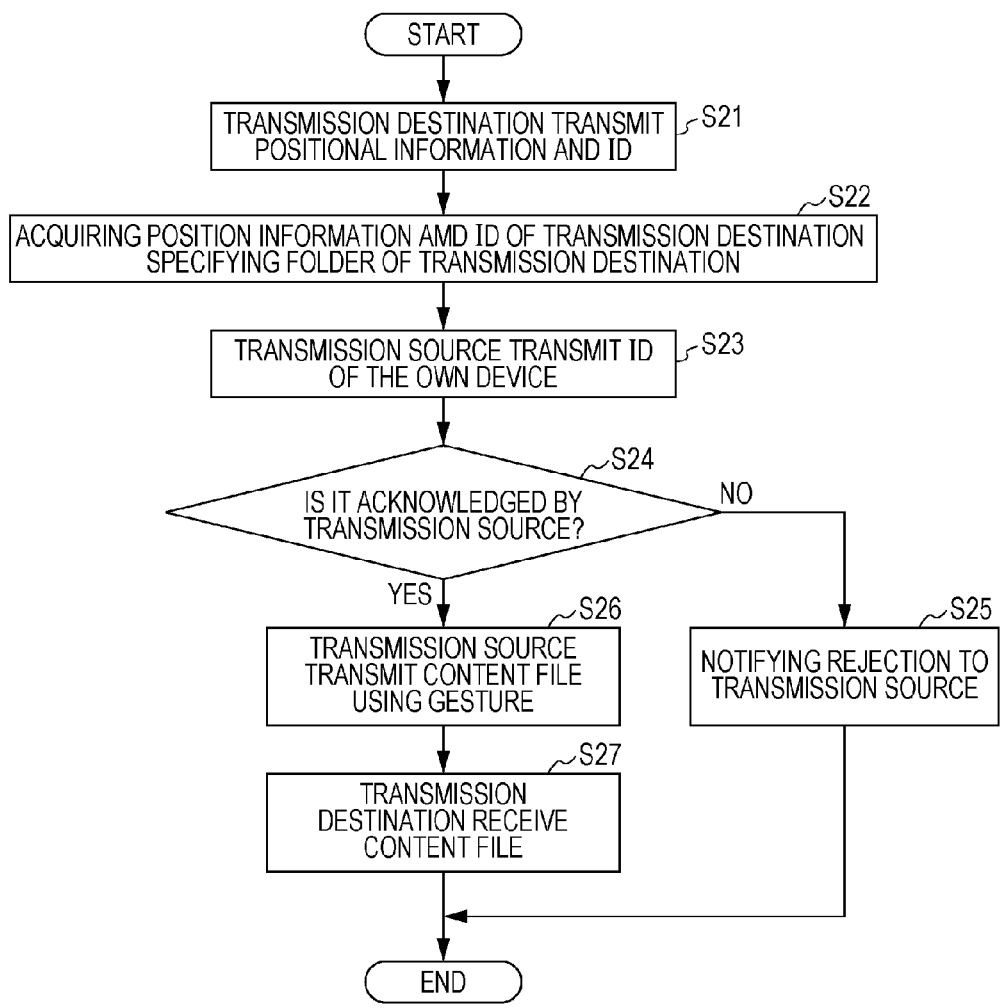
FIG. 10 is a flowchart which is showing an example of processing of transmission destination in the folder dividing process, in the first embodiment of the disclosure.

FIG. 10 shows an example in which the transmission destination is processed in a folder dividing process.

In the process, the camera 1 as the transmission source performs transmitting of the content.

First, a camera 2 as the transmission destination transmits position information and an ID to the camera 1 (Step S21). Next, the camera 1 obtains the position information and the ID of the camera 2 as the transmission destination, and specifies folders of the transmission destination of the camera 2 (Step S22). Further, the camera 1 transmits its own ID to the camera 2 (Step S23). Transmitting the ID to the camera 2 from the camera 1, is an alarm that notifies the camera 2 that content has arrived in the camera 2 from the camera 1.

Subsequently, the camera 1 determines whether or not the camera 2 permits a transmission of the content (Step S24). When the camera 2 rejects the transmission of the content, camera 1 is notified and the process ends (Step S25)

On the other hand, when the camera 2 permits the transmission of the content, the camera 1 uses the user gesture and transmits the content to the camera 2 (Step S26). In addition, the camera 2 receives the content from the camera 1 and ends the process (Step S27).

As described above, in the content transceiving system 3 according to the first embodiment of the disclosure, the camera 1 as the transmission source of the content obtains position information of the camera 2 as the transmission destination along with its own position information. Further, the system ascertains the orientation of the camera 2 with respect to the camera 1. The system transmits content from the camera 1 to the camera 2 in a wireless manner, when a predetermined gesture is made in this orientation to the camera 1. For this reason, an improved embodiment is proposed to make it possible to transmit and receive content between cameras.

In addition, the user is able to perform various operations using the value obtained by a motion detection unit 11-1 as a trigger, and to use them when transmitting content. However, the value obtained by the motion detection unit 11-1 allows the display unit 19-1 to display the virtual folder, and is used to control the transmission and reception of the content.

<1-2. A Modified Example of the First Embodiment>

Figure 11:
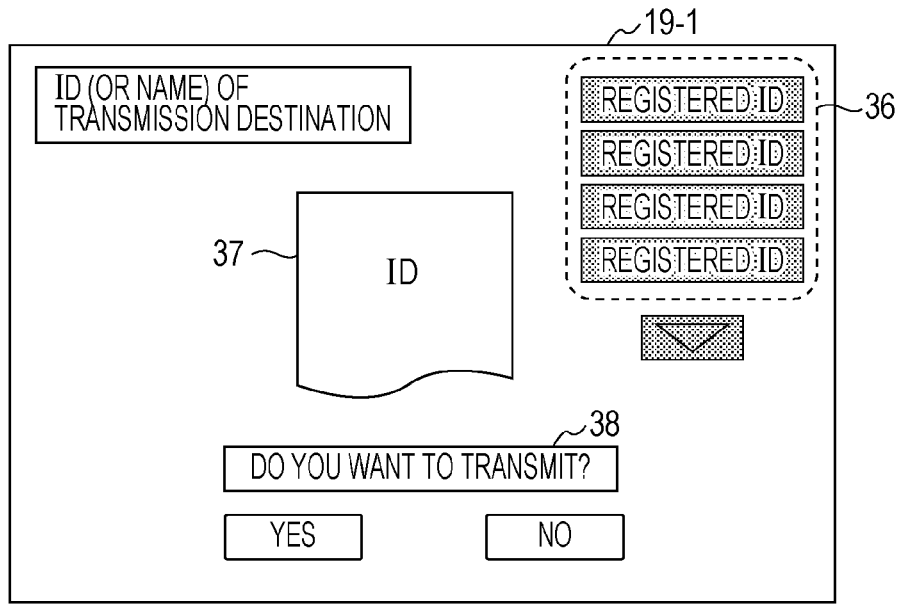
FIG. 11 is an explanatory diagram for showing a modified example of a screen display example when one content item, which is displayed on a display unit, is transmitted, in the first embodiment of the disclosure.
Figure 12:
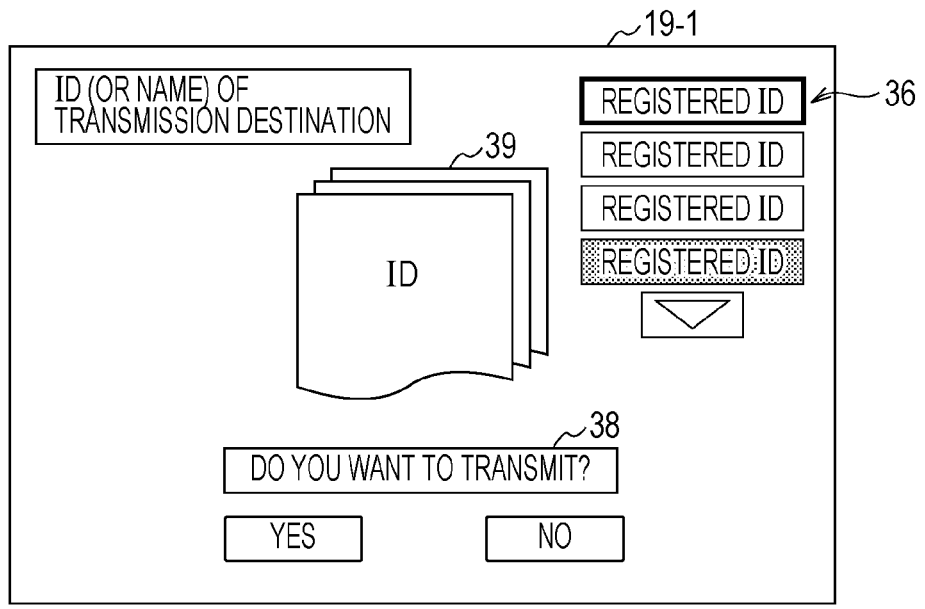
FIG. 12 is an explanatory diagram for showing a modified example of a screen display example when a plurality of content, which is displayed on the display unit, is transmitted, in the first embodiment of the disclosure.

In addition, a display as shown in FIGS. 11 and 12 may be performed with regard to an icon of the camera 2 which is displayed in the camera 1. Here, a modified example of a user interface which is displayed on the display unit 19-1, respectively, will be described, in a case where the camera 2 which receives content is a single device or plural devices (A Case where a Single Transmission Control Device (Camera 1) and a Single Reception Control Device (Camera 2) Exist)

FIG. 11 is a display example of a display unit 19-1 in a case where content is transmitted to the single camera 2.

The camera 1 transmits content selected in advance to the camera 2 by a user moving the camera 1, after confirming that the camera 2 is in a state capable of receiving (the motion changes according to a movement of hands; however, here, the motion of the user "moving" the camera 1 is "a gesture for transmitting content" which means that content is transmitted to the camera 2 from the camera 1).

An identification information display section 36, which displays an ID or a name for uniquely identifying the camera 2 as the transmission destination of the content, is displayed on the upper portion of the display unit 19-1. In the example, since there is a single camera 2 for receiving the content, the identification information display section 36 and the scroll button of the camera 2 that are displayed on the right side of the display unit 19-1 are grayed out. However, the user can display the registered ID which is hidden under the identification information display section 36, on the identification information display section 36 by selecting the scroll button.

In addition, near the center of the display unit 19-1, a virtual folder 37, which shows IDs of the content whose transmission destination is selected, is displayed. A message column 38, which prompts the user to determine the transmission of the content, is displayed on the lower side of the display unit 19-1. Further, the ID of the camera 2, which is the transmission destination of the content, is displayed on the virtual folder 37. When permitting the transmission of the content to the camera 2, a "yes" button is selected, and then the arms holding the camera 1 are moved toward the camera 2. In this manner, the content is transmitted to the camera 2 from the camera 1. On the other hand, in a case where a "no" button is selected, the content is not transmitted according to the following motions.

(A Case when there is a Single Transmission Control Device (Camera 1) and a Plurality of Reception Control Devices (Camera 2))

FIG. 12 is a display example of a screen when transmitting a plurality of content, which is displayed on the display unit 19-1.

The camera 1 transmits the content selected in advance to the camera 2 through the users moving their the camera 1 after confirming that the plurality of cameras 2 is in a state capable of receiving content, and after selecting the camera 2, which is the transmission destination through the GUI.

In the example, a plurality of virtual folders 39 is displayed near the center of the display unit 19-1, in order to transmit the content by specifying a single camera 2 from the plurality of cameras 2. Virtual folders 39, in which other registered IDs are displayed, are also displayed on the display unit 19-1. In this case, since there is a plurality of receivers with respect to a single transmission control device, the IDs of the candidates of the transmission destination, which can be seen, are displayed, and the virtual folders 39 are also displayed, by the number of virtual folders. In these virtual folders 39, the position of the cameras 2 is displayed to be located on the left, in the center, and on the right when seen from the camera 1, in order from the front. In addition, in the identification information display section 36, the position of the camera 2 is displayed to be located on the left, in the center, and on the right, when seen from the camera 1, in the order from the top. The remaining IDs, which are not displayed, may be displayed using a scroll bar.

In addition, when the user selects "yes" with respect to an inquiry whether or not the content which is stored in the virtual folder 39 is to be transmitted, it is moved to a content transmission process using a user gesture. Here, when a transmission destination is switched to a different camera 2 from a certain camera 2, a zoom key or a cross key included in an operation unit 20-1, is used to make a switching instruction. Along with this switching, the virtual folder 39 is rolled to be displayed on the display unit 19-1. In this manner, a single camera 2 is specified from the plurality of cameras 2, and the content is transmitted to the camera 2.

<2-1. A Second Embodiment>
[An Example of Controlling Content Transmission and Reception Between Camera and Server]

Subsequently, the second embodiment of the disclosure will be described with reference to FIGS. 13 to 15B. In the embodiment, an example, which is applied to a content transceiving system 5 which performs transmitting and receiving between a camera 1 and a server 4, will be described. In the following description, the same reference numerals are given to a part corresponding to FIG. 1, which have already been described in the first embodiment, and detailed descriptions thereof will be omitted.

Figure 13:
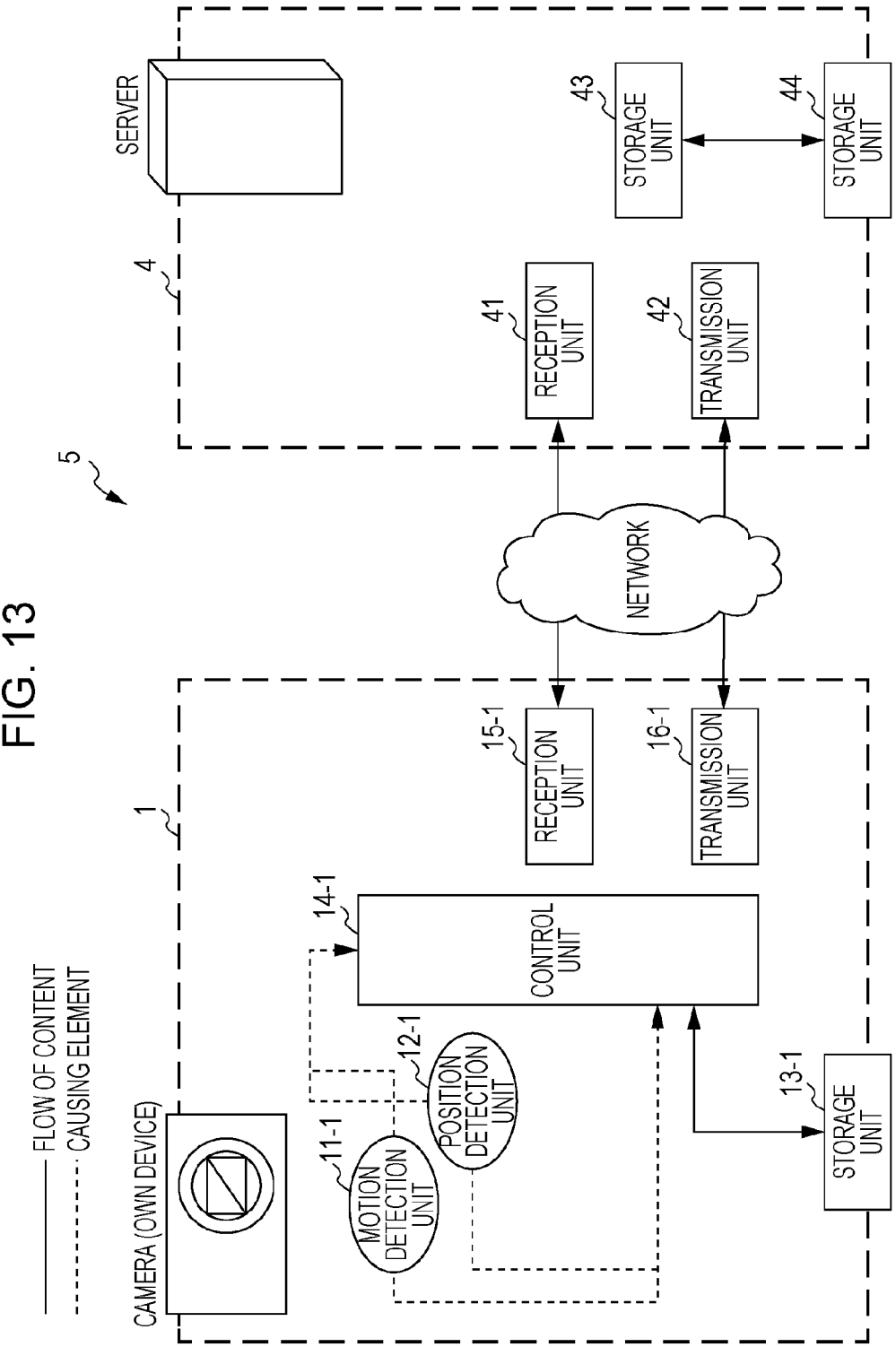
FIG. 13 is a block diagram showing an example of an internal configuration of a content transceiving system, in a second embodiment of the disclosure.

FIG. 13 shows an example of an internal configuration of the content transceiving system 5 in the embodiment.

The content transceiving system 5 includes the camera 1 and the server 4. The camera 1 and the server 4 can transmit data to each other through a wireless communication (for example, Wi-Fi (registered trademark)) using an AP, which is not shown.

The server 4 includes a reception unit 41 for receiving content from the camera 1 and a transmission unit 42 for transmitting content to the camera 1. In addition, the server 4 further includes a recording unit 44 which records the content using a directory structure defined for each user using the camera 1, and control unit 43 for controlling operations of each unit in the sever 4

(2-1. A Case where Reception Control Device is Server with Respect to a Single Transmission Control Device)

Figure 14:
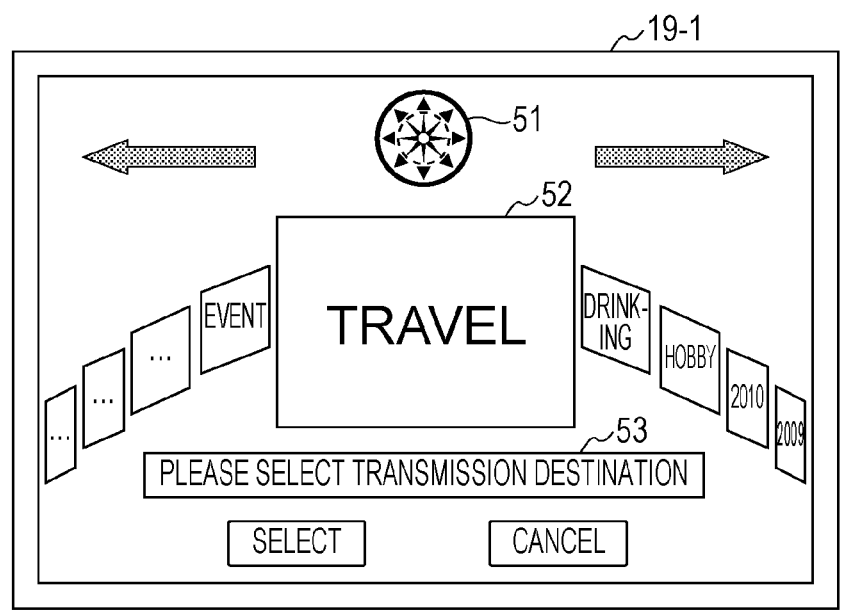
FIG. 14 is an explanatory diagram for showing a display example of a screen, on which content to be transmitted to a server, is displayed according to the orientation where a user orients a camera, in the second embodiment of the disclosure.

FIG. 14 shows a display example of a screen on which the content to be transmitted to the server 4 is displayed, according to the orientation where the user is facing, holding the camera 1.

When the bearing of a region which is determined from a regional information relating to the content, with respect to the current position which is detected by the positional detection unit 12-1, substantially matches the orientation which is detected using the position detection unit 12-1, the display output unit 18-1 performs following operations. That is, information showing content, which is related to the regional information is highlighted with respect to the display unit 19-1, and an operation for changing information for showing the highlighted content, is performed every time the orientation is changed. In addition, when detecting the fact that a predetermined motion was made toward the orientation of information showing the highlighted content, the control unit 14-1 performs a control of transmitting the highlighted content to the server 4.

A compass icon 51, which shows an orientation that the user is facing, is displayed on the upper side of the display unit 19-1. A virtual folder 52, which displays a content to be transmitted to the server of the transmission destination, is displayed in the vicinity of the center of the display unit 19-1. A content group which is scrolled in a circular shape, is displayed in the periphery of the virtual folder 52. The user can arbitrarily select content by tilting the camera 1 and scrolling the target content. A message column 53, which inquires about the possibility of transmission and urges the user to determine the transmission of the content, is displayed on the lower side of the display unit 19-1.

Information on the orientation is linked in advance to a folder which includes content, in the camera 1. For example, when "north" and "travel" are linked, the "travel" folder is indicated when the user faces north holding the camera 1, wherever the camera 1 is. In addition, when "place" is linked to the folder, the camera does not necessarily face the place and the same orientation every time. When the camera 1 transmits the content to the server 4, the virtual folder 52 is supposed to be seen on the display unit 19-1. The content is uploaded to the server 4 when the transmitter moves the own device to the orientation where the folder is seen. At this time, the transmission unit 16-1 transmits directory information (path) of the highlighted content to the server 4. In this manner, it is possible to share the content while maintaining a structure of the directory, on the server 4.

Figure 15A:
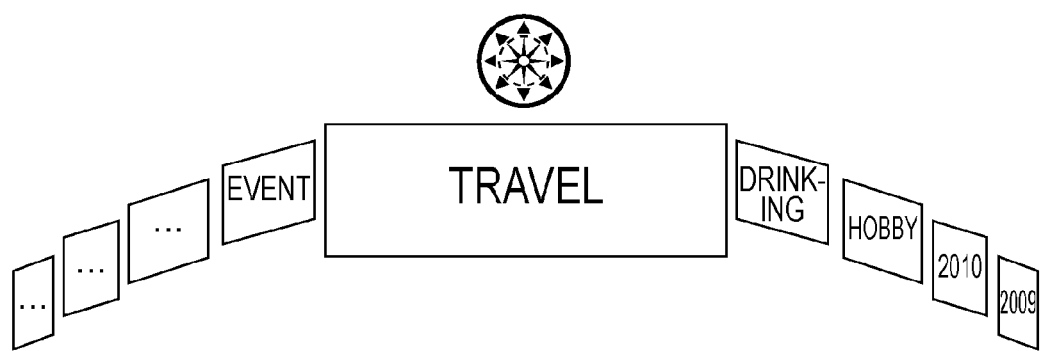
FIGS. 15A and 15B are explanatory diagrams for showing an example where a user interface is changed, in a case where the orientation of the camera is changed, in the second embodiment of the disclosure.
Figure 15B:

FIGS. 15A and 15B show examples where a user interface changes, in a case where a facing orientation of the camera 1 is changed.

FIG. 15A shows an example where the travel folder, which is linked to north is displayed when the camera 1 faces north.

FIG. 15B shows an example where a drinking folder, which is linked to north, is displayed when the camera 1 faces north-northeast.

In this case, the name of a folder as a candidate of the transmission destination is displayed on the display unit 19-1, when the camera 1 faces north, in order for a single camera 1 to transmit a file to the server 4. The name of the folder is the name of the displayed folder which is created in the recording unit 44 of the server 4. In addition, an ID which is linked to another orientation and shows a folder which is not displayed in the virtual folder 52 in the center of the display unit 19-1 is displayed in a state of being arranged at the periphery of the virtual folder 52, so as to be displayed in the virtual folder 52 along the orientation the camera 1 is facing.

When the orientation of the camera 1 matches the orientation, which is linked to the virtual folder, an inquiry urging selection of the transmission destination, is displayed in a message column 53. Further, after the user answers the inquiry, the process is moved to a gesture. The switching of the transmission destination can be made by using a zoom key or a cross key. Along with the switching of the transmission destination, the virtual folder rolls. As described above, when the camera 1 faces the orientation where the virtual folder 52 is seen, the user interface, which is displayed in a half circle, changes. At this time, since it is scrolled to a folder corresponding to a facing orientation, the compass icon, which is present on the upper center of the screen, changes its orientation in a synchronizing manner.

Accordingly, all of the icons are displayed to be shifted to the left. However, there is no case where the folder on the left end comes out to the right. In addition, when the registration folder is the folder only in a case as described above, which is the folder on the left end moves to the right end.

According to the content transceiving system 5 in the second embodiment as described above, the camera 1, as the transmission source of the content, obtains information related to the orientation which is linked to the virtual folder stored on the server 4, as the transmission source, along with position information of the device itself. Further, the camera 1 ascertains the orientation linked to the virtual folder, which is displayed on the display unit 19-1 in accordance with the orientation of the own device. When a predetermined gesture is made toward the orientation, the content is transmitted to the server from the camera 1 in a wireless manner. For this reason, it is possible to suggest a new embodiment for transmitting content between a server and a camera.

<2-2. A Modified Example of the Second Embodiment>

Figure 16:
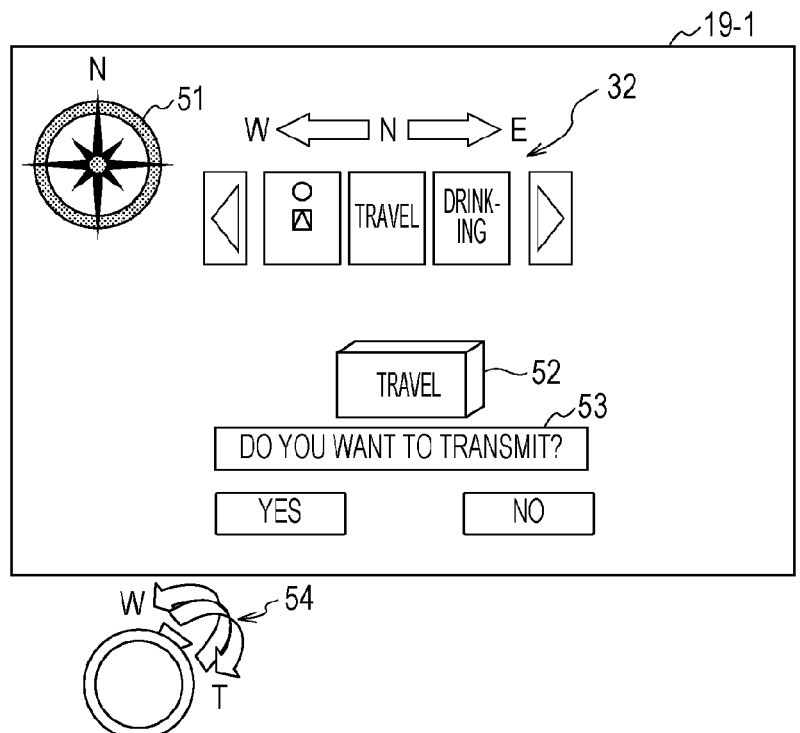
FIG. 16 is an explanatory diagram for showing a modified example of a screen display example, in a case where content to be displayed on the display unit is transmitted, in the second embodiment of the disclosure.
Figure 17:
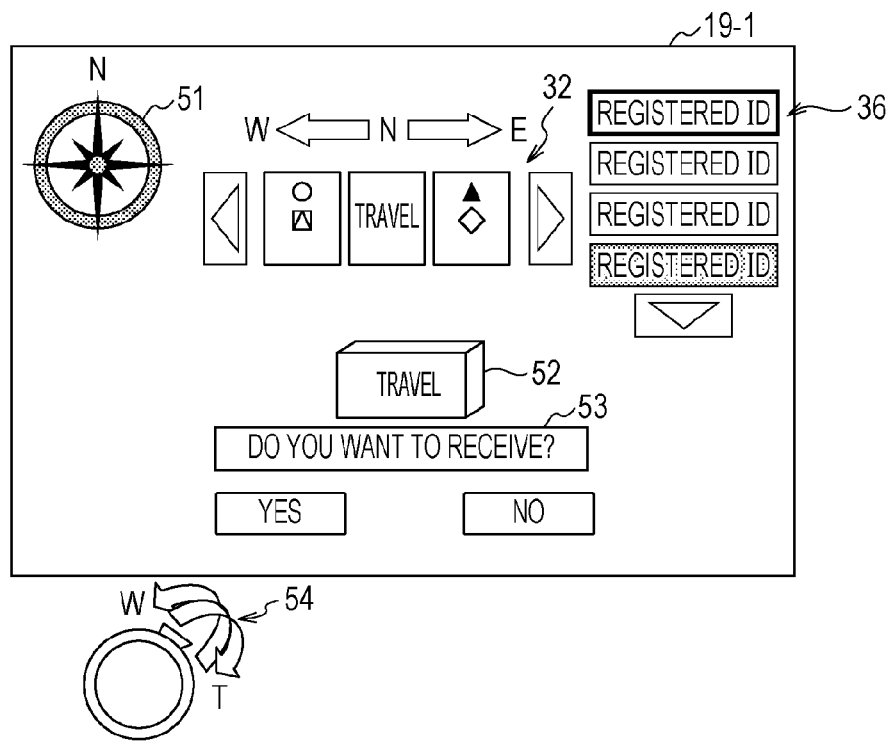
FIG. 17 is an explanatory diagram for showing a modified example of a screen display example, in a case of receiving content to be displayed on the display unit, in the second embodiment of the disclosure.

In addition, the icon of the camera 2 which is displayed in the camera 1, may be displayed as shown in FIGS. 16 and 17. Here, a modified example of the user interface which is displayed on the display unit 19-1 will be described, respectively, in a case where the camera 1 transmits a file to the server 4, and a case where the camera 1 receives a file from the server 4

(A Case when there is a Single Transmission Control Device (Camera 1) and a Reception Control Device (Server 4))

FIG. 16 shows a display example of the display unit 19-1, in a case where a single camera 1 transmits content to the server 4.

In this case, for example, the Wi-Fi (registered trademark) is also used in a communication between the camera 1 and the server 4. Further, the orientation (geo-tagging) and the virtual folder 52 are linked in advance to each other. In the display unit 19-1, the folder name of the virtual folder, in which content to be preferably transmitted is included, is displayed in the virtual folder 52 in the center of the screen along with the compass icon 51. At this moment, the orientation of the camera 1 matches the position of the virtual folder, after answering the inquiry displayed in the message column 53, the process moves to a gesture.

When switching content to be transmitted to a different imaginary folder from a certain imaginary folder, the instruction to switch is made using the zoom key or the cross key, which is not shown, provided in the operation unit 20-1. Along with this switching, the virtual folder 39 is also displayed in the virtual folder 52, by rolling. In this manner, the content included in the virtual folder corresponding to the orientation, is transmitted to the server 4, after facing the camera 1 in an arbitrary orientation (A Case when there is a Single Transmission Control Device (Camera 1) and a Reception Control Device (Server 4))

FIG. 17 shows a display example of the display unit 19-1 in a case where a single camera 1 receives content from the server 4.

A control unit 14-1 performs a control of receiving content from the server 4 which preserves a folder storing content, corresponding to information which is related to the orientation, when a fact, that a predetermined motion was made is detected. The control is performed to receive content which is stored in a folder preserved by the server, to which the orientation which substantially matches the own orientation is related.

When the camera 1 receives content from the server 4, the display unit 19-1 is set so that a virtual folder which includes content received from the server 4, is displayed in the virtual folder 52. A content selected in advance, is obtained from an arbitrary imaginary folder, when a user, who is holding the camera 1, moves the device itself toward himself from an orientation of the virtual folder which is seen.

In this case, there is a possibility that another other camera 2 is present in the same orientation (north, in the example). In such a case, in order not to mistake the other camera 2 for the server 4, a registered ID for the server 4 is designated in the identification information display column 36. In this manner, it is possible to prevent content from being received from the other camera 2 which is present in the orientation in which reception is intended.

According to the content transceiving systems 3 and 5 in the first and second embodiments as described above, it is possible to provide improved operability for sharing content between a plurality of cameras and servers. In the transmission and reception of the content, it is preferable to designate the camera 2 or the server 4 as the transmission destination or the reception destination, accordingly, it is not necessary to perform a complex operation, for example, where the content is copied to a removable media or the like, to be delivered. In addition, with regard to the server 4, it is possible to secure the capacity of a folder which is the reception destination of the content simply by additionally providing a recording medium with a large capacity, such as an HDD. For this reason, it is possible to improve the collectability of the content by sharing the same content by a plurality of users. In addition, since the users share the content with each other by adding new content, the frequency of photography using the cameras 1 and 2 increases and purchase rates of the camera increases as well.

<3. A Modified Example>

In addition, in the first and second embodiments as described above, the camera 1 includes an operation detection unit 11-1 (for example, a gyro-sensor), a position detection unit 12-1 (for example, a GPS receiver), a reception unit 15-1, and a transmission unit 16-1. Further, the camera 2 includes an operation detection unit 11-2 (for example, a gyro-sensor), a position detection unit 12-2 (for example, a GPS receiver), a reception unit 15-2, and a transmission unit 16-2. However, the cameras 1 and 2 may not necessarily have a photography function, and without an imaging unit, may be a portable terminal only having a function of reproducing content (for example, a digital photo frame, a mobile phone, or a mobile game player).

In addition, a virtual folder is defined as information showing the camera 2 of the transmission destination, other graphic icons may be displayed, regardless of the shape of the folder.

In addition, when a single camera 1 is employed as the transmission destination and there is a plurality of cameras 2, the content may be integrally transmitted to the plurality of cameras 2 by the camera 1 which is performing a predetermined operation. Further, the content may be simultaneously transmitted to the plurality of cameras 2 from the camera 1 through the server 4.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission control device comprising:
an acquiring unit to acquire information indicating an orientation of a transmission apparatus; and
a control unit to control the transmission apparatus to transmit to a first reception apparatus of a plurality of reception apparatuses content of the transmission apparatus when an operation is performed to the transmission apparatus after the information indicating the orientation is acquired, the operation corresponding to a predetermined orientation;
wherein the control unit controls a display, on a display screen, of an indication that a second reception apparatus of the plurality of reception apparatuses is not a reception apparatus of the plurality of reception apparatuses selected for transmission of the content, based on a determination of a positional relationship of each of the first reception apparatus and the second reception apparatus, the determination using position information acquired from the first reception apparatus and the second reception apparatus and based on which of the first reception apparatus and the second reception apparatus has an angle of a position nearest to a reference line determined using the orientation of the transmission apparatus.

2. The device of claim 1, wherein the control unit controls a display, on a display screen, of an icon indicating the orientation according to a state of the transmission apparatus.

3. The device of claim 1, wherein the control unit controls a display of an index screen for selecting an image as the content to be transmitted.

4. The device of claim 1, wherein the control unit controls a display of a display screen for selecting the first reception apparatus as a transmission destination of the content.

5. The device of claim 1, wherein the control unit controls a display, on a display screen, for selecting at least two of the plurality of reception apparatuses as transmission destinations of the content.

6. The device of claim 1, wherein the control unit controls acquiring of the position information and identification information of the first and second reception apparatuses.

7. The device of claim 1, wherein the control unit controls specifying a folder of the first reception apparatus.

8. The device of claim 1, wherein the control unit controls transmission of identification information of the device to the first reception apparatus.

9. The device of claim 1, wherein the control unit determines whether the first reception apparatus permits transmission of the content.

10. The device of claim 1, wherein, when the first reception apparatus permits the transmission of the content, the control unit controls the transmission of the content using a gesture as the operation.

11. The device of claim 1, wherein the control unit controls a display, on a display screen, of content selectable to be transmitted to the first reception apparatus, according to the orientation of the transmission apparatus.

12. The device of claim 1, wherein the control unit controls a display, on a display screen, of the content with indicia according to the orientation of the transmission apparatus.

13. The device of claim 12, wherein the control unit controls the display of the indicia with the content, when information, which relates to the content, corresponds to the orientation of the transmission apparatus.

14. The device of claim 13, wherein the control unit controls transmission of the content displayed with the indicia when a predetermined operation is performed to the transmission apparatus.

15. The device of claim 12, wherein the indicia is highlighting.

16. The device of claim 1, wherein the content includes at least one of text, audio, an image, a file or a folder.

17. The device of claim 1, wherein, when the content includes a moving image, the control unit controls the transmission of the moving image to the first reception apparatus by streaming.

18. The device of claim 1 further comprising:
a position unit to obtain the position information of the first and second reception apparatuses and position information of the transmission apparatus.

19. The device of claim 1, wherein the operation is a predetermined gesture.

20. The device of claim 1, wherein the content is transmitted wirelessly.

21. The device of claim 1, wherein directory information of the content is transmitted to the first reception apparatus when the content is transmitted.

22. A method of transmission control comprising: acquiring information indicating an orientation of a transmission apparatus;
controlling, by a processor, the transmission apparatus to transmit to a first reception apparatus of a plurality of reception apparatuses content of the transmission apparatus when an operation is performed to the transmission apparatus after the information indicating the orientation is acquired, the operation corresponding to a predetermined orientation; and
controlling, by the processor, a display, on a display screen, of an indication that a second reception apparatus of the plurality of reception apparatuses is not a reception apparatus of the plurality of reception apparatuses selected for transmission of the content, based on a determination of a positional relationship of each of the first reception apparatus and the second reception apparatus, the determination using position information acquired from the first reception apparatus and the second reception apparatus and based on which of the first reception apparatus and the second reception apparatus has an angle of a position nearest to a reference line determined using the orientation of the transmission apparatus.

23. A transceiver apparatus comprising:
an acquiring unit to acquire information indicating an orientation of the apparatus;
an operation detection unit to detect an operation performed to the apparatus; and
a control unit to control the apparatus to transmit to a first reception device of a plurality of reception devices content of the apparatus when an operation is performed to the apparatus after the information indicating the orientation is acquired, the operation corresponding to a predetermined orientation,
wherein the control unit controls a display, on a display screen, of an indication that a second reception device of the plurality of reception devices is not a reception device of the plurality of reception devices selected for transmission of the content, based on a determination of a positional relationship of each of the first reception device and the second reception device, the determination using position information acquired from the first reception device and the second reception device and based on which of the first reception device and the second reception device has an angle of a position nearest to a reference line determined using the orientation of the apparatus, and wherein the control unit controls reception of content from a transmission device at the apparatus when the operation performed to the apparatus after the information indicating the orientation is acquired corresponds to a predetermined orientation.

* * * * *